May 20, 1969          D. E. RUNKLE          3,444,753
NO-LASH AXIALLY MOVABLE STEERING COLUMN
Filed Dec. 14, 1967          Sheet 1 of 2
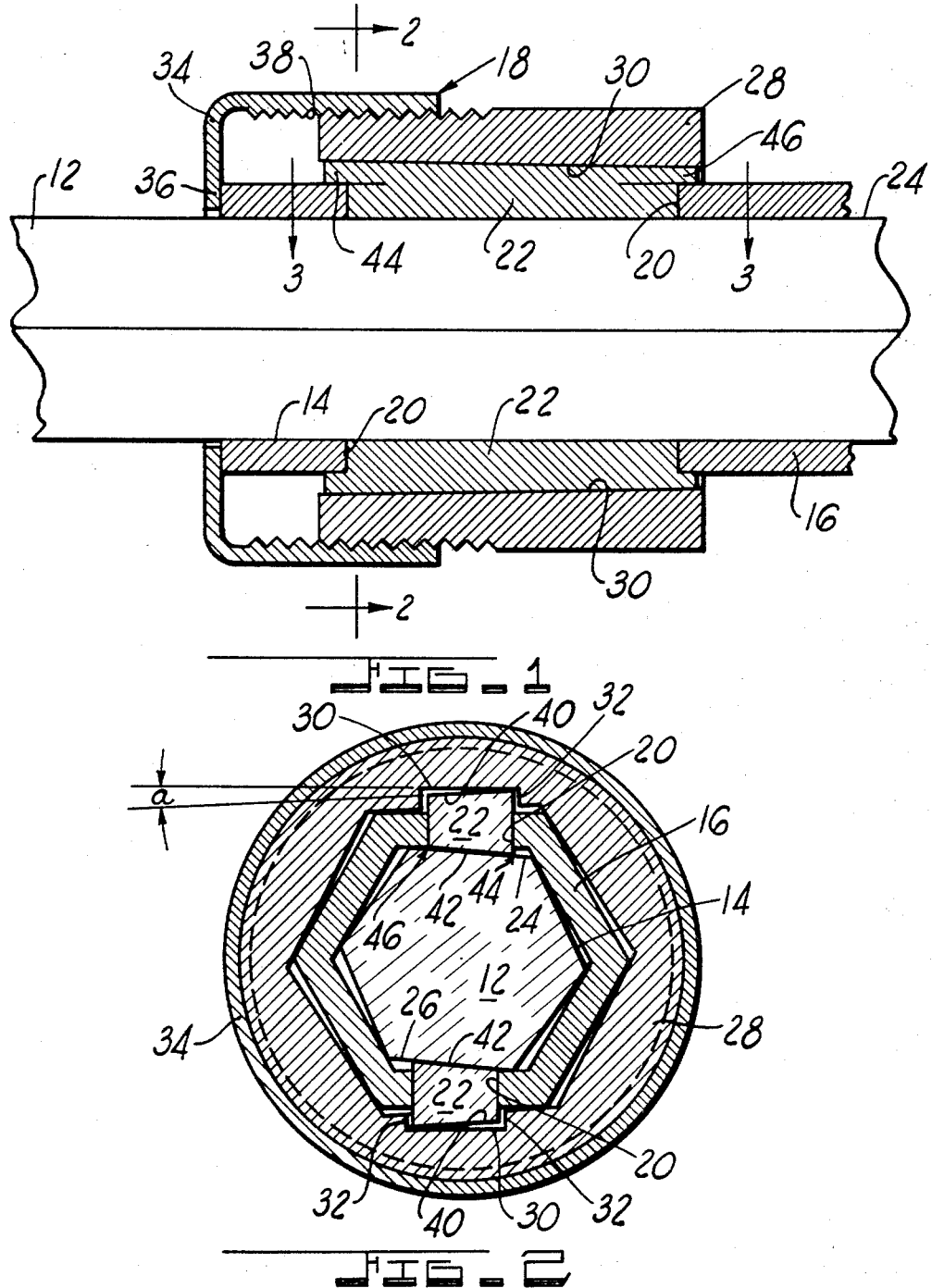
INVENTOR.
DEAN E. RUNKLE
BY
William N. Antonis
ATTORNEY

United States Patent Office 3,444,753
Patented May 20, 1969

3,444,753
NO-LASH AXIALLY MOVABLE
STEERING COLUMN
Dean E. Runkle, South Bend, Ind., assignor to The
Bendix Corporation, a corporation of Delaware
Filed Dec. 14, 1967, Ser. No. 690,612
Int. Cl. B62d 1/18
U.S. Cl. 74—493          14 Claims

ABSTRACT OF THE DISCLOSURE

A steering column arrangement having telescoping shafts, the inner of which has a polygonal shape and the outer of which has a corresponding polygonal bore for receiving the first shaft. A mechanism for eliminating lost motion or "lash" between the two shafts includes a slot located in the outer shaft, a wedge block of corresponding shape located in the slot which abuts a polygonal surface of the inner shaft at an off-center location, a collar telescoped over the inner and outer shafts and having an inclined ramp on the inner surface thereof for loading and causing inward movement of the wedge block against the inner shaft upon axial movement of the collar relative to the outer shaft, and a nut operatively connected to the collar and outer shaft so that rotation of the nut will cause axial movement of the collar relative to the outer shaft to thereby vary the load exerted by the wedge block against the inner shaft.

Background of the invention

In my earlier issued U.S. Patent No. 3,318,170, which also related to a lash-free axially movable steering column for use on a driver-operated motor vehicle, the torsional lash was eliminated from two polygonal telescoping shafts of the steering column by utilizing a plurality of pre-loaded members located in one of the shafts which abutted different polygonal surfaces of the other shaft at a location off center of the abutting polygonal surface to cause rotation and continuous frictional engagement of one of the shafts with respect to the other of the shafts to thereby eliminate torsional lash therebetween. In the embodiments illustrated in my previously mentioned patents the preload was provided by utilizing a coil spring, a rubber block, or other elastomer. In such installations, it oftentimes was difficult to achieve the desired spring preload and to maintain this same preload under all conditions.

The instant novel mechanism is intended to accomplish the same end insofar as the elimination of torsional lash between two telescoping shafts is concerned, but in an improved, more rugged, and more predeterminable manner. In addition, it is intended to accomplish this end without utilizing resilient means, such as, coil springs, rubber blocks, etc., for providing the necessary load. Furthermore, this improved mechanism incorporates means for varying the preload to any desired predetermined value after installation of the steering shaft and for maintaining the load thereafter at said value.

Summary of the invention

Accordingly, it is an object of this invention to provide a collapsible steering column having inner and outer telescoping shafts wherein the problems of achieving the desired preload and maintaining same under all conditions is eliminated.

Another object of this invention is to provide a lash-free telescoping steering column which will collapse when it is subject to a predetermined load.

A further object of this invention is to provide a lash-eliminating connector for a telescoping steering column which is less expensive to fabricate and more rugged than comparable connectors.

More specifically, it is an object of this invention to provide a mechanism of the type described which includes a slot located in the outer shaft, a wedge block of corresponding shape located in the slot which abuts a polygonal surface of the inner shaft at an off-center location, a collar telescoped over the inner and outer shafts and having an inclined ramp on the inner surface thereof for loading and causing inward movement of the wedge block against the inner shaft upon axial movement of the collar relative to the outer shaft, and a nut operatively connected to the collar and outer shaft so that rotation of the nut will cause axial movement of the collar relative to the outer shaft to thereby vary the load exerted by the wedge block against the inner shaft.

A still further object of this invention is to provide a mechanism of the type described wherein the ramp is angularly disposed in a transverse plane with respect to the wedge block surfaces so as to cause the load exerted against the wedge block to be concentrated at the edge of the wedge block most distant from the centerline of the abutting polygonal surface of the inner shaft.

The above and other objects and features of this invention will become apparent from the following description taken in connection with the accompanying drawings.

Brief description of the drawings

FIGURE 1 is an enlarged sectional view of a portion of a steering column of a vehicle showing the axially movable components thereof and the mechanism incorporating the invention;

FIGURE 2 is an exaggerated sectional view taken along line 2—2 of FIGURE 1;

Referring to FIGURES 1 and 2, it will be seen that a shaft 12 having a hexagonal shape is located in a corresponding hexagonal bore 14 formed in a shaft 16. One of the shafts is suitably connected to the steering wheel (not shown) of a vehicle, whereas the other of said shafts is suitably connected to the steering gear (not shown) of the vehicle. If needed, it will be understood that a universal joint of the type disclosed in my U.S. Patent No. 3,296,830, issued Jan. 10, 1967, can be interposed between the steering wheel and the shaft connected thereto and/or the steering gear and the shaft connected thereto. Because of the telescopic arrangement between shafts 12 and 16 it will be apparent that axial adjustment of the vehicle steering wheel can be accomplished simply by pushing or pulling on the steering wheel. Furthermore, in the event of an accident, injury to the driver will be minimized because the steering column can telescope or collapse upon impact.

Figure 3:
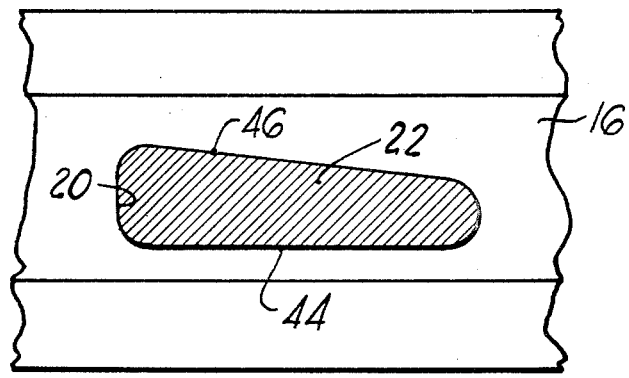
FIGURE 3 is a sectional view taken along line 3—3 of FIGURE 1 with the collar and nut removed therefrom.

Since it is impractical from a tolerance standpoint to make the telescoping shafts 12 and 16 lash free, a coupling mechanism, indicated generally by the numeral 18, is utilized to cause relative rotation and continuous frictional engagement between the two shafts. The coupling mechanism includes two axially extending slots 20 located in outer shaft 16, each of which contains a slidable wedge block 22 of corresponding shape. One of the wedge blocks abuts the polygonal surface 24 of shaft 12 at an off-center location thereof and the other wedge block abuts the opposite polygonal surface 26 of shaft 12 at an off-center location thereof. A collar 28, which is telescoped over the inner and outer shafts 12 and 16, includes two inclined ramps 30, one of which contacts one of the wedge blocks and the other of which contacts the other of the wedge blocks for loading and causing inward movement of the wedge blocks against the inner shaft upon axial movement of the collar relative to the outer shaft. Such loading of the wedge blocks creates a couple, that is, a pair of equal parallel forces acting in opposite directions tending to produce relative rotation between the inner and outer shafts. The collar 28 is prevented from rotating relative to the shafts by the ramp shoulders 32 which can abut the wedge blocks. A nut 34 which abuts the end of outer shaft 16 through means of a flange 36 is connected to the collar through suitable means, such as threads 38, so that rotation of the nut will cause axial movement of the collar relative to the outer shaft.

From the foregoing, it will be understood that the load exerted by the wedge blocks can be adjusted or varied to any desired predetermined value, simply by rotating the nut 34. Thus, rotation of the nut in one direction will cause the collar and inclined ramps to move in an axial direction tending to increase the load exerted by the wedge blocks, whereas rotation of the nut in the other direction will cause the collar and inclined ramps to move in an opposite axial direction tending to decrease the load exerted by the wedge blocks.

Figure 4:
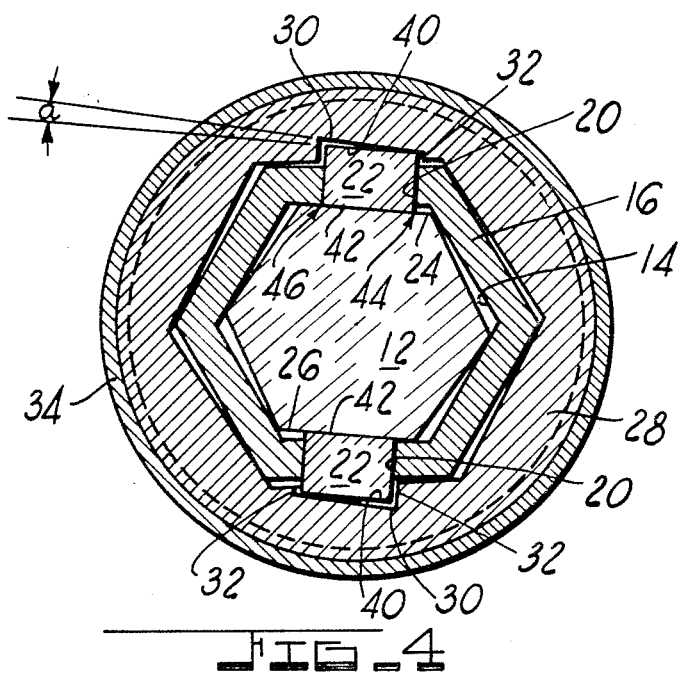
FIGURE 4 is an exaggerated sectional view similar to that of FIGURE 2 which shows another embodiment of the invention.

It will be noted from the various figures, particularly FIGURE 2, that each wedge block is formed with a first axially inclined surface 40 which contacts the oppositely disposed axially inclined ramp 30 of the collar 28, and a second surface 42 which contacts the abutting polygonal surface of the inner shaft 12. The second surface 42 includes a primary torque transmitting edge 44 and a secondary torque transmitting edge 46, the first of which 44 is spaced more distant from the center line of the abutting polygonal surface than the other edge 46. In order to cause the load exerted against the wedge block to concentrate at the primary torque transmitting edge 44, it will be noted from FIGURE 2 that the axially inclined plane of the ramp 30 is angularly disposed in a transverse plane with respect to one or both of the first and second wedge block surfaces 40 and 42. Whether the transverse section of the wedge block is trapezoidal, as shown in FIGURE 2, or rectangular, as shown in FIGURE 4, is immaterial so long as the inclined ramp 30 is angularly disposed in a transverse plane with respect to the first and/or second wedge block surfaces 40 and 42 by an angle $a$.

Furthermore, in order to assure a substantially uniform load along the primary torque transmitting edge 44 of the wedge block and obtain the desired couple it will be noted that the primary torque transmitting edge is located so that it is substantially parallel to the center line of the abutting polygonal surface. The secondary torque transmitting edge 46 of the wedge block is skewed with respect to the center line of the abutting polygonal surface so that the wedge block will always be properly oriented with respect to the inclined ramp and the abutting polygonal surface of the inner shaft. In addition in order to provide a larger ramp bearing surface and to limit the load exerted against the inner shaft, each wedge is formed with ledges 44 and 46 at the axially disposed ends thereof. If desired, the inner shaft abutting surface 42 of the wedge block can be suitably coated with a friction reducing material, such as Teflon.

From the foregoing, it will be apparent that this invention provides a unique coupling mechanism for a telescoping column which is lash-free and adjustable for preload. The several practical advantages which flow from this type of an adjustable and/or collapsible steering column arrangement are believed to be obvious from the above, and other advantages may suggest themselves to those who are familiar with the art to which this invention relates.

Furthermore, although this invention has been described in connection with certain specific embodiments, it will be obvious to those skilled in the art that various changes may be made in the form, structure, and arrangement of parts without departing from the spirit of the invention. For example, shafts having shapes and corresponding bores other than hexagonal would be suitable in the practice of this invention. Accordingly, I do not desire to be limited to the specific embodiments disclosed herein primarily for purposes of illustration.

Having thus described the various features of the invention what I claim as new and desire to secure by Letters Patent is:

1. An axially movable steering column comprising inner and outer shafts, one of which is axially movable with respect to the other of said shafts, said inner shaft having a polygonal shape and said outer shaft having a corresponding polygonal bore therein for receiving said inner shaft, and means operatively connected to said inner and outer shafts for causing rotation and continuous frictional engagement of one of said shafts with respect to the other of said shafts to thereby eliminate torsional lash therebetween, said means comprising slot means located in said outer shaft, wedge means located in said slot means for abutting a polygonal surface of said inner shaft, said wedge means having a center line at a location spaced from the center line of said polygonal surface, a collar member telescoped over said inner and outer shafts, said collar member having ramp means located on the inner surface thereof in contact with said wedge means for loading and causing inward movement of said wedge means against said inner shaft upon axial movement of said collar member relative to said outer shaft, means formed in said collar member for preventing rotation of said collar member relative to said outer shaft but permitting axial movement thereof relative thereto, and a nut member telescoped over said inner and outer shafts for varying the load exerted by said wedge means against said inner shaft, said nut member being operatively connected to said collar member and said outer shaft so that rotation of said nut member will cause axial movement of said collar member relative to said outer shaft.

2. The structure, as defined in claim 1, wherein said slot means includes a plurality of slots, said wedge means includes a plurality of slidable wedge blocks, one of which is located in each of said slots, and said ramp means includes a plurality of inclined ramps, one of which is disposed opposite each slot and in contact with the wedge block located in said slot.

3. The structure, as defined in claim 2, wherein each wedge block includes a first surface in contact with said one inclined ramp and a second surface in contact with said abutting polygonal surface of said inner shaft, said second surface having primary and secondary torque transmitting edges, the first of which is more distant from the center line of said abutting polygonal surface than the other, said oppositely disposed inclined ramp being angularly disposed in a transverse plane with respect to one of said first and second wedge block surfaces so that axial movement of said collar member will cause the load exerted against said wedge block to be concentrated at said primary torque transmitting edge.

4. The structure, as defined in claim 3, wherein said primary torque transmitting edge is substantially parallel to the center line of said abutting polygonal surface.

5. The structure, as defined in claim 4, wherein said secondary torque transmitting edge is skewed with respect to the center line of said abutting polygonal surface.

6. The structure, as defined in claim 5, wherein each wedge block includes a ledge located between said oppositely disposed ramp and said outer shaft for providing a larger ramp bearing surface and for limiting the load exerted against said inner shaft.

7. An axially movable steering column comprising inner and outer shafts, one of which is axially movable with respect to the other of said shafts, said inner shaft having a polygonal shape and said outer shaft having a corresponding polygonal bore therein for receiving said inner shaft, and means operatively connected to said inner and outer shafts for causing rotation and continuous frictional engagement of one of said shafts with respect to the other of said shafts to thereby eliminate torsional lash therebetween, said means comprising a slot located in said outer shaft, a wedge block of corresponding shape located in said slot for abutting a polygonal surface of said inner shaft, said wedge block having a centerline at a location spaced from the centerline of said polygonal surface, a collar member telescoped over said inner and outer shafts and having an inclined ramp located on the inner surface thereof in contact with said wedge block for loading and causing inward movement of said wedge block against said inner shaft, said wedge block including a first surface in contact with said inclined ramp and a second surface having primary and secondary torque transmitting edges in contact with said abutting polygonal surface of said inner shaft, said primary torque transmitting edge being more distant from the center line of said abutting polygonal surface than the secondary torque transmitting edge, said inclined ramp being angularly disposed in a transverse plane with respect to one of said first and second wedge block surfaces so that the load exerted against said wedge block will be concentrated at said primary torque transmitting edge, and non-resilient means operatively connected to said collar member and said outer shaft for preventing movement of said collar member relative to said outer shaft and maintaining a load on said wedge block.

8. An axially movable steering column comprising inner and outer shafts, one of which is axially movable with respect to the other of said shafts, said inner shaft having a polygonal shape and said outer shaft having a corresponding polygonal bore therein for receiving said inner shaft, mechanism operatively connected to said inner and outer shafts for causing rotation and continuous frictional engagement of one of said shafts with respect to the other of said shafts to thereby eliminate torsional lash therebetween, said mechanism comprising a slot located in said outer shaft, wedge means located in said slot for abutting a polygonal surface of said inner shaft, said wedge means having a center line at a location spaced from the center line of said polygonal surface, collar means telescoped over said inner and outer shafts, said collar means having an inner surface thereof in contact with said wedge means, said collar means and wedge means being arranged so that relative axial movement therebetween will load said wedge means and cause radially inward movement thereof against said inner shaft, said wedge means including a wedge block having first and second oppositely disposed surfaces one of which has primary and secondary torque transmitting edges in contact with said abutting polygonal surface of said inner shaft, said primary torque transmitting edge being more distant from the center line of said abutting polygonal surface than the secondary torque transmitting edge, an inclined ramp formed on one of said aforementioned means, said inclined ramp being angularly disposed in a transverse plane with respect to one of said first and second wedge block surfaces so that the load exerted against said wedge block will be concentrated at said primary torque transmitting edge, and means operatively connected to one of said aforementioned means for urging same in an axial direction tending to load said wedge block and cause inward movement thereof.

9. The structure, as defined in claim 8, wherein said primary torque transmitting edge is substantially parallel to the center line of said abutting polygonal surface.

10. The structure, as defined in claim 9, wherein said secondary torque transmitting edge is skewed with respect to the center line of said abutting polygonal surface.

11. The structure, as defined in claim 9, wherein said wedge block includes a ledge located between said inclined ramp and said outer shaft for providing a larger ramp bearing surface and for limiting the load exerted against said inner shaft.

12. The structure, as defined in claim 11, wherein said second surface of said wedge block which contacts said abutting polygonal surface of said inner shaft is coated with a friction reducing material.

13. An axially movable steering column comprising inner and outer shafts, one of which is axially movable with respect to the other of said shafts, said inner shaft having a polygonal shape and said outer shaft having a corresponding polygonal bore therein for receiving said inner shaft, mechanism operatively connected to said inner and outer shafts for causing rotation and continuous frictional engagement of one of said shafts with respect to the other of said shafts to thereby eliminate torsional lash therebetween, said mechanism comprising a slot located in one of said shafts, wedge means located in said slot for abutting a polygonal surface of said other shaft, said wedge means having a center line at a location spaced from the center line of said polygonal surface, abutment means operatively connected to one of said shafts, said abutment means having a surface thereof in contact with said wedge means, said abutment means and wedge means being arranged so that relative axial movement therebetween will load said wedge means and cause radial movement thereof against said other shaft, said wedge means including a wedge block having first and second oppositely disposed surfaces one of which has primary and secondary torque transmitting edges in contact with said abutting polygonal surface of said other shaft, said primary torque transmitting edge being more distant from the center line of said abutting polygonal surface than the secondary torque transmitting edge, an inclined ramp formed on one of said aforementioned means, said inclined ramp being angularly disposed in a transverse plane with respect to one of said first and second wedge block surfaces so that the load exerted against said wedge block will be concentrated at said primary torque transmitting edge, and means operatively connected to one of said aforementioned means for urging same in an axial direction tending to load said wedge block and cause radial movement thereof.

14. The structure, as defined in claim 13, wherein said slot is located in said outer shaft, said wedge means abuts a polygonal surface of said inner shaft, and said abutment means is operatively connected to said outer shaft.

References Cited

UNITED STATES PATENTS 3,220,743    11/1965    Knapp      287—58 X
3,318,170    5/1967    Runkle      74—493

MILTON KAUFMAN, *Primary Examiner.*

U.S. Cl. X.R.

287—58